United States Patent Office 2,862,951
Patented Dec. 2, 1958

2,862,951

PREPARATION OF ESTERS OF AN OXY ACID OF BORON

Stanley F. Stafiej, Stamford, Conn., assignor to American Cyanamid Company, New York, N. Y., a corporation of Maine No Drawing. Application August 26, 1957
Serial No. 680,388

8 Claims. (Cl. 260—462)

This invention relates to certain new and useful improvements in a method of preparing esters of an oxy acid of boron (including esters of the various boronic and borinic acids), for example esters of the various substituted boronic and borinic acids and, more particularly, esters of the hydrocarbon-substituted boronic and borinic acids. Still more particularly, the invention is concerned with improvements in a method of preparing esters of a hydrocarbon-substituted boronic acid by reaction between (1) a boron triester represented by the general formula I

wherein each R represents a hydrocarbon radical and (2) a member of the class consisting of (a) Grignard reagents containing a hydrocarbon radical and (b) metallic magnesium physically associated with a hydrocarbon halide represented by the general formula

II              R'—X wherein R' represents a hydrocarbon radical and X represents a halogen selected from the class consisting of chlorine, bromine and iodine.

The improvement of the present invention comprises a particular technique for decomposing the complex obtained as an intermediate product of reaction in reactions of the kind described above (as well as any unreacted Grignard reagent), which complex is designated hereinafter and in the appended claims either for purpose of clarity or sometimes for brevity as a "Grignard complex" or a "Grignard intermediate." This technique involves treating the reaction mass containing the Grignard complex or intermediate with a saturated aqueous solution of an acidic ammonium salt of an acid having a pK value of less than 4.75. Examples of such salts are ammonium chloride, ammonium sulfate and ammonium nitrate. Other examples will be given hereinafter and in the examples which follow. The improvement of this invention makes it possible to prepare and isolate the desired esters conveniently in a one-step reaction (exclusive of the preparation of pre-formed Grignard reagent when used) with a minimum of time.

In general, the improvement with which this invention is concerned gives high yields of the desired esters; that is, higher yields than heretofore have been known in this particular art. This is especially true with respect to the esters of arylboronic acids (e. g., esters of phenyl- and tolylboronic acids), which are relatively less stable to hydrolysis than their alkyl analogs; and, even more so, with regard to the butyl (dibutyl) and higher alkyl (dialkyl) esters of the arylboronic acids. By using the improvement of this invention in producing these latter esters, yields have been improved as much as two to three times the yields heretofore obtainable by the previously known methods.

Esters of the alkylboronic acids and of arylboronic acids are broadly old in the art, and have been prepared by various methods. Thus, Frankland and Duppa (Proc. Roy. Soc., 1859, 10, 568; J. 1862, 15, 363) made diethyl ethylboronate by the controlled oxidation of spontaneously inflammable triethylboron:

III        

Johnson and Van Campen (J. Amer. Chem. Soc., 1938, 60, 121) quantitatively converted tri-n-butylboron into the boronate by means of absolutely dry air. Wiberg and Krüerke (Z. Naturforsch, 1953, 8b, 608, 609, 610) prepared dimethyl methylboronate by the following reaction:

IV    

Khotinsky and Melamed (Ber., 1909, 42, 3090) produced certain alkyl esters of phenyl- or m-tolyl-boronic acids in unstated yields as intermediates in the preparation of the acids from the arylmagnesium bromide and the trialkyl borate at 0° C. Michaelis and Becker (Ber., 1882, 15, 180) obtained diethyl phenylboronate by the interaction of ethanol and phenylboron dichloride (prepared from boron trichloride and diphenylmercury). Michaelis (Annalen, 1901, 315, 19) prepared the corresponding boronate from α-naphthylboron dichloride and sodium methoxide.

Brindley, Gerrard and Lappert (J. C. S., 1955, 2956) prepared various esters of alkyl- and arylboronic acids. As stated by these authors in their abstract:

"Di-n-butyl boronate was prepared from n-butyl-magnesium bromide (1 mol.), or, in better yield, from n-butyl-lithium (1 mol.) and tri-n-butyl borate. The n-octyl reagents and tri-n-butyl borate gave n-butyl di-n-octylboronite as principal product. Owing to the greater ease of hydrolysis of arylboronates, the same method was not practicable for the preparation of esters of phenylboronic acid, but these were obtained in excellent yields by esterification of the acid or anhydride by an azeotropic method, not suitable for the tert.-butyl ester. This was obtained by action of phenylboron dichloride on tert.-butyl alcohol and pyridine."

In a typical preparation involving the addition of n-butylmagnesium bromide to tri-n-butyl borate, a Grignard reagent in ether was added dropwise over a period of 1 hour with vigorous stirring to the borate in 100 cc. of ether at —70° C., using equal molar proportions of the above reactants. Thereafter, the mixture was poured into ice water and carefully neutralized with dilute hydrochloric acid. The ethereal layer was washed with water and dried over magnesium sulfate, and the boronate was obtained. The yield of di-n-butyl n-butylboronate was 42% of the theoretical, based on the amount of Grignard reagent (or on the amount of tri-n-butyl borate) employed. Another reaction involved the addition, with stirring, of phenylmagnesium bromide in ether to tri-n-butyl borate in ether at —70° C., using equal molar proportions of these reactants. The product, di-n-butyl phenylboronate, was obtained in a yield of 25% of the theoretical, calculated on the same basis as mentioned above. The addition of n-octylmagnesium bromide in ether dropwise with stirring to tri-n-butyl borate in ether at —60° C., using equal molar proportions of these reactants, and working up the reaction mass in a manner similar to that described above, gave 33 g. of n-butyl di-n-octyl boronite and 10 g. of di-n-butyl n-octylboronate.

The present invention is based on my discovery that, in producing boron esters by methods such as are broadly described in the first paragraph of this specification, improved results are obtained by using a saturated aqueous solution of an acidic ammonium salt of an acid having a pK value of less than 4.75 (instead of the water and/or aqueous acid previously used in this art) to decompose the Grignard complex, e. g.

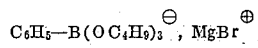

and any unreacted Grignard reagent. A saturated aqueous solution of an acidic ammonium salt of an acid of the kind above-defined effectively decomposes the Grignard intermediate to generate the desired ester without introducing water into the reaction mass in an amount sufficient to hydrolyze the desired ester to an appreciable or objectionable extent (if at all).

As will be readily understood by those skilled in the art, by obviating or minimizing the hydrolysis of the boron-ester reaction product one obtains directly from the process a higher yield of the desired ester than otherwise is attainable in a one-step reaction of the kind with which the invention is concerned. The alternative technique requires that one hydrolyze the boron ester (or mixture of boron esters) substantially completely to the corresponding boron acid or acids, isolate the acids from the reaction mass, and then esterify the isolated acids. The disadvantages of such a method are readily apparent: at least one additional, time-consuming step is required, thereby adding to the cost of the product; and yields tend to be lower due, for one reason, to losses normally encountered when an additional step or steps are an inherent part of a process. These and other disadvantages are obviated by the present invention.

Illustrative examples (in addition to those mentioned hereinbefore) of acidic ammonium salts of an acid having a pK value of less than 4.75 of which saturated aqueous solutions can be made, and such solutions used in practicing the present invention, are:

Ammonium bromide
Ammonium chlorate
Ammonium perchlorate
Ammonium tartrate
Ammonium sulfite
Ammonium bromoacetate
Ammonium alpha-bromopropionate
Ammonium dichloroacetate
Ammonium formate
Ammonium fumarate
Ammonium phosphate
Ammonium dihydrogen phosphate
Ammonium pyrophosphate
Ammonium trichloroacetate The improvement of the present invention is particularly useful in the preparation of esters of a hydrocarbon-substituted boronic acid by reaction between (1) a boron triester represented by Formula I, that is,

wherein each R represents a hydrocarbon radical and (2) a Grignard reagent containing a hydrocarbon radical. The latter expression embraces Grignard reagents represented by the general formula V                    R''MgX'' wherein R'' represents a hydrocarbon radical and X'' represents a halogen, more particularly chlorine, bromine or iodine. Grignard reagents embraced by Formula V wherein X'' represents fluorine are not precluded, especially those which either are presently known or could be made by known methods.

As has been stated hereinbefore, the invention is also applicable in a method of preparing esters of a hydrocarbon-substituted boronic acid by reaction between (1) a boron triester of the kind embraced by Formula I and (2) metallic magnesium physically associated with a hydrocarbon halide represented by Formula II, that is, R'—X wherein R' represents a hydrocarbon radical and X represents a halogen selected from the class consisting of chlorine, bromine and iodine. This latter method of preparing esters of a hydrocarbon-substituted boronic acid, as well as other B-hydrocarbon-substituted boron compounds, is broadly and specifically claimed in the copending application of Stephen J. Groszos, Serial No. 680,394, filed concurrently herewith, wherein also is disclosed, but not claimed, the addition of a saturated aqueous solution of an ammonium salt, specifically ammonium chloride and ammonium sulfate, to decompose the complex between the boron ester and the magnesium salts. Reference is made to this copending application of Groszos for a more detailed description of the reactants and the reaction conditions up to the decomposition of the aforementioned complex, which latter step only is involved in the present invention.

Illustrative examples of hydrocarbon radicals represented by R, R', and R'' in Formulas I, II and V are alkyl (including cycloalkyl), alkenyl (including cycloalkenyl), aralkyl, aralkenyl, aryl, alkaryl and alkenylaryl. More specific examples of such radicals are methyl, ethyl, propyl, isopropyl, butyl, isobutyl, sec.-butyl, amyl, isoamyl, hexyl to octadecyl, inclusive (both normal and isomeric forms), cyclopentyl, cyclopentenyl, cyclohexyl, cyclohexenyl, cycloheptyl, etc.; benzyl, phenylethyl, phenylpropyl, phenylisopropyl, phenylallyl, etc.; phenyl, biphenylyl or xenyl, naphthyl, etc.; tolyl, xylyl, ethylphenyl, propylphenyl, isopropylphenyl, butylphenyl, allylphenyl, etc.; and vinyl, allyl, methallyl, propenyl, isopropenyl (beta-allyl), 1-butenyl, 2-butenyl (crotyl), 3-butenyl, pentenyl, hexenyl, butadienyl, etc. It will be noted that all of the foregoing examples of hydrocarbon radicals are those wherein any unsaturation between adjacent carbon atoms is a double bond.

Specific examples of compounds embraced by the formula R''MgX'' (Grignard reagent) that can be reacted with a boron triester of the kind embraced by Formula I are given in Kharasch and Reinmuth's "Grignard Reactions of Nonmetallic Substances," Prentice-Hall, Inc., New York, N. Y. (1954), and in the references cited therein. A convenient index of Grignard reagents, including those embraced by R''MgX'' (Formula V), is given (on the basis of empirical formulas) on pages 1348–1362 of this publication. In this index and throughout the book are numerous examples of Grignard reagents wherein the organic grouping is other than a hydrocarbon radical and which likewise might be used as a reactant with a boron triester of the kind embraced by Formula I, and the improvement of this invention then practiced in decomposing the resulting Grignard complex.

The improvement of the present invention is operative in a method of preparing esters of an arylboronic acid (and/or an arylborinic acid), e. g., a dialkyl ester of phenylboronic acid, a monoalkyl ester of diphenylborinic acid, or both such esters when obtained as products of the same Grignard reaction, as said reaction has been described hereinbefore (also in cited references), and as the procedure of Groszos has been described more fully in his aforementioned copending application. The Grignard reagent can be, for example, an aryl-Grignard reagent, specifically a phenylmagnesium or a tolylmagnesium chloride, bromide or other halide; or an alkyl-Grignard reagent, e. g., methyl-, ethyl-, propyl-, butyl-, amyl-, hexyl-, heptyl-, octyl-, nonylmagnesium chloride, bromide or other halide, as well as the higher alkyl homologues including octadecyl and even higher; or other hydrocarbon-Grignard reagents (including substituted-hydrocarbon Grignard reagents such as those named in the aforementioned Kharasch and Reinmuth publication).

The boron triester (triester of boric acid) is preferably a tributyl borate or a higher trialkyl borate, e. g., triamyl to tri-(octadecyl) borates. One can use the trimethyl borate, the triethyl borate, the tri-n-propyl borate or the tri-isopropyl borate as the boron triester reactant, but the improvement in yields of the diester of the hydrocarbon-substituted boronic acid is less outstanding when this invention is used in producing such esters. To the best of my knowledge and belief, the improvement with which this invention is concerned is operative in decomposing effectively the intermediate product of reaction of a Grignard reagent (or metallic magnesium physically associated with the hydrocarbon halide represented by Formula II) with any boron triester of the kind embraced by Formula I.

Decomposition of the Grignard complex obtained as an intermediate product in the Grignard reaction with the boron-triester starting reactant (or a di-hydrocarbon ester of a boronic acid if such be used as a starting reactant in producing mainly a borinate) is effected by contacting (as by titration, for example) the reaction mass containing the same with a saturated aqueous solution of an acidic ammonium salt of an acid having a pK value of less than 4.75. This is preferably done by adding to the reaction mass (for instance in small increments as in a titration) a saturated aqueous solution of the aforementioned salt, e. g., ammonium chloride, in an amount just sufficient to decompose the Grignard complex. The resulting boronate (and/or borinate) is then isolated from the reaction mass by any suitable means, e. g., by filtering off the insoluble magnesium salts and distilling the filtrate to strip off the solvent (if used), unreacted boron triester and the desired esters.

In order that those skilled in the art better may understand how the present invention can be carried into effect, the following examples are given by way of illustration and not by way of limitation. All parts and percentages are by weight unless otherwise stated.

Example 1 o-Tolymagnesium bromide is prepared from o-bromotoluene (128.2 g., 0.75 mole) and magnesium metal (18.24 g., 0.75 g. atom) in 500 ml. of anhydrous ether (diethyl ether) in a 3-necked Grignard flask, taking the usual precautions against the admission of moisture and air. The Grignard solution is added slowly over a 1½-hour period to a stirred solution of tri-n-butyl borate (172 g., 0.75 mole) in 100 ml. of ether maintained at about −78° C. The reaction mixture is then allowed to warm to room temperature over a period of about 16 hours, during which time it separates into two phases.

The reaction mass is cooled in an ice-water bath. While thus cooled, the Grignard complex obtained as an intermediate product of the reaction as well as any unreacted Grignard reagent is decomposed by adding to the aforesaid reaction mass, containing the said complex and any unreacted Grignard reagent, a saturated aqueous solution of ammonium chloride. The addition of this ammonium chloride solution to the reaction mass is continued to the point at which the inorganic salts (products of decomposition of the Grignard materials) separate rapidly from a clear solution.

The ether solution is decanted from the insoluble salts and filtered through anhydrous sodium sulfate. The filtrate is stripped at atmospheric pressure to remove the ether, and the residue is then distilled under reduced pressure. After removing the butanol fraction, the main portion boiling at 120°–122° C. under 2 mm. pressure is collected as the di-n-butyl ester of o-tolylboronic acid (di-n-butyl-o-tolylboronate). The reported boiling point of this ester is 139°–140° C. at 9 mm. pressure. The yield amounts to 121.4 g., which corresponds to about 66% of the theoretical based on the amount of o-bromotoluene used.

The dark-brown residue remaining in the distillation vessel after distilling off the volatile materials solidifies upon cooling. Recrystallization of this residue from water yields 3.5 g. of o-tolylboronic acid, M. P. 165°–168° C. (reported M. P., 168° C.).

Example 2

Same as in Example 1 with the exception that, instead of decomposing the Grignard complex obtained as an intermediate product of the reaction, and any unreacted Grignard reagent, by adding a saturated aqueous solution of ammonium chloride to the reaction mass, there is used, in individual preparations, a saturated aqueous solution of (a) Ammonium bromide,
(b) Ammonium sulfate,
(c) Ammonium chlorate,
(d) Ammonium perchlorate, and
(e) Ammonium nitrate.

Addition of the saturated aqueous solution of the salt is continued to the point at which the inorganic salts separate rapidly from a clear solution. A high yield of the desired di-n-butyl-o-tolylboronate is obtained in each case.

Example 3 n-Butylmagnesium bromide is prepared in the usual way from n-butyl bromide (24.7 g., 0.2 mole) and metallic magnesium (4.9 g., 0.2 g. atom) in 125 ml. of ether. The brown Grignard solution is added dropwise over a 1-hour period to a stirred solution of tri-n-butyl borate (46 g., 0.2 mole) in 50 ml. of ether maintained at about −78° C. The reaction mixture is allowed to warm to room temperature while standing over a period of about 16 hours. After decomposing the Grignard complex and any unreacted Grignard reagent in the reaction mass (cooled to 0° C.), by dropwise addition of a saturated aqueous solution of ammonium chloride in the manner described under Example 1, the clear ether solution is decanted from the precipitated magnesium salts. The ether and butanol are removed from the decanted solution by distillation at atmospheric pressure, and the di-n-butyl ester of butylboronic acid (di-n-butyl butylboronate) is collected as the fraction boiling at 81°–82° C. under a pressure of 3 mm. The reported boiling point of this ester is 105° C. at 10 mm. pressure. The yield amounts to 21 g., which corresponds to about 49% of the theoretical based on the amount of n-butyl bromide employed.

Example 4

Essentially the same procedure is followed as described under Example 3 with the exception that, instead of decomposing the Grignard complex obtained as an intermediate product of the reaction, and any unreacted Grignard reagent, by adding a saturated aqueous solution of ammonium chloride to the reaction mass, there is used, in individual preparations, a saturated aqueous solution of (a) Ammonium tartrate (diammonium tartrate),
(b) Ammonium sulfite,
(c) Ammonium bromoacetate, and
(d) Ammonium alpha-bromopropionate.

The addition of the saturated aqueous solution of the salt to the reaction mass is continued, in each case, to the point described under Examples 1 and 2. The di-n-butyl butylboronate is obtained in very good yields with each preparation.

Example 5

Phenylmagnesium bromide is prepared in the usual way from bromobenzene (235.5 g., 1.5 moles) and metallic magnesium (36.4 g., 1.5 g. atom) in 750 ml. of anhydrous ether. The Grignard reagent is added as in Example 1 to a solution of tri-n-butyl borate (256 g., 1.5 moles) in 200 ml. of ether. Working up the reaction mass as described under Example 1, including the use of a saturated aqueous solution of ammonium chloride to decompose the Grignard complex and any unreacted Grignard reagent, yields 230 g. of di-n-butyl phenylboronate, B. P. 120°–126° C. under a pressure of 2 mm. The reported boiling point of this ester is 139°–140° C. at 10 mm. pressure. It is obtained in a yield corresponding to about 67% of the theoretical based on the amount of bromobenzene used.

*Example 6*

Essentially the same procedure is followed as described under Example 5 with the exception that, instead of decomposing the Grignard complex and any unreacted Grignard reagent by adding a saturated aqueous solution of ammonium chloride to the reaction mass, there is used, in individual preparations, a saturated aqueous solution of (a) Ammonium formate,
(b) Ammonium fumarate (diammonium fumarate), and
(c) Ammonium dichloroacetate.

The addition of the saturated aqueous solution of the salt to the reaction mass is continued, in each preparation, to the point at which the inorganic salts separate rapidly from a clear solution. The desired di-n-butyl ester of phenylboronic acid is obtained in a high yield in each case.

*Example 7*

The following equation illustrates, in simplified form, the primary reaction involved in this example:

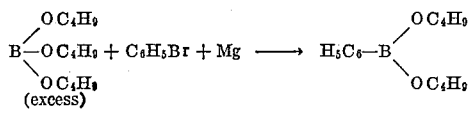

Twenty-five (25) ml. of tributyl borate, i. e., tri-n-butyl borate (of a total of 1085 ml.; 920 g., 4 moles), is added to a reaction vessel provided with a stirrer and two dropping funnels, to which vessel previously has been added 24.32 g. (1 g. atom) of magnesium turnings. The magnesium is pretreated by etching with 10 percent aqueous hydrochloric acid, followed by successive washings with water, ethanol, acetone, and ether, after which it is dried at 105° C. A small amount of bromobenzene (of a total of 157 g., 1 mole) is then added to the reaction mass, together with a crystal of iodine to initiate the reaction. The reaction mass is heated to reflux without stirring. When the purplish iodine color has disappeared at 120° C., indicating that the reaction has begun, stirring is started. The remaining tributyl borate (1060 ml.) is then added concurrently with the addition of the remaining bromobenzene from the second dropping funnel. Thirty minutes after completing these additions, a gummy solid separates on the sides of the vessel and the solution becomes yellow. As refluxing continues the solution becomes more viscous and the color intensifies. After maintaining the reaction temperature for several hours at about 228° C., which is the boiling point of tri-n-butyl borate, heating and stirring are discontinued. The reaction mass, at the end of the reaction period, is a viscous liquid while hot but solid at room temperature.

The solid reaction mass is pulverized in a dry nitrogen atmosphere, and about 1500 cc. of anhydrous diethyl ether is added. Upon addition of a saturated aqueous solution of ammonium chloride, the ether becomes cloudy; and upon further addition solid material begins to separate from solution. The saturated ammonium chloride solution is added to the point at which the ether solution becomes clear. The ether solution is then decanted from the precipitated magnesium salts and distilled. After removing solvent and butanol, the desired ester (di-n-butyl phenylboronate) is obtained in a high yield by distillation at reduced pressure.

*Example 8*

Same as in Example 7 with the exception that there is used, in individual preparations (instead of a saturated aqueous solution of ammonium chloride), a saturated aqueous solution of one of the following ammonium salts:

(a) Ammonium nitrate,
(b) Ammonium phosphate,
(c) Ammonium dihydrogen phosphate,
(d) Ammonium pyrophosphate, and
(e) Ammonium trichloroacetate.

The desired di-n-butyl ester of phenylboronic acid is obtained in a high yield in each case.

I claim:

1. In a method of preparing an ester of a hydrocarbon-substituted boronic acid by reaction between (1) a boron triester represented by the formula

wherein each R represents a hydrocarbon radical wherein any unsaturation between adjacent carbon atoms is a double bond, and (2) a member of the class consisting of (a) Grignard reagents containing a hydrocarbon radical wherein any unsaturation between adjacent carbon atoms is a double bond, and (b) metallic magnesium physically associated with a hydrocarbon halide represented by the formula R'—X where R' represents a hydrocarbon radical wherein any unsaturation between adjacent carbon atoms is a double bond, and X represents a halogen selected from the class consisting of chlorine, bromine and iodine, the improvement which comprises decomposing the Grignard complex obtained as an intermediate product of the reaction by treating the reaction mass containing the same with a saturated aqueous solution of an acidic ammonium salt of an acid having a pK value of less than 4.75, and isolating the aforesaid ester of a hydrocarbon-substituted boronic acid from the resulting reaction mass.

2. The improvement as in claim 1 wherein the ammonium salt is ammonium chloride.

3. The improvement as in claim 1 wherein the ammonium salt is ammonium sulfate.

4. In a method of preparing an ester of an arylboronic acid by a Grignard reaction between (1) a boron triester represented by the formula

wherein each R represents a hydrocarbon radical wherein any unsaturation between adjacent carbon atoms is a double bond, and (2) an aryl-Grignard reagent, the improvement which comprises decomposing the Grignard complex obtained as an intermediate product of the reaction by contacting the reaction mass containing the same with a saturated aqueous solution of an acidic ammonium salt of an acid having a pK value of less than 4.75, and isolating the aforesaid ester of a hydrocarbon-substituted boronic acid from the resulting reaction mass.

5. The improvement as in claim 4 wherein the ammonium salt is ammonium chloride.

6. In a method of preparing a dialkyl ester of phenylboronic acid by reaction between a trialkyl borate and a phenylmagnesium halide, the improvement which comprises adding to the reaction mass, containing the Grignard complex obtained as an intermediate product of the reaction, a saturated aqueous solution of an acidic ammonium salt of an inorganic acid having a pK value of less than 4.75 in an amount that is sufficient to decompose said Grignard complex; and isolating the resulting dialkyl ester of phenylboronic acid from the reaction mass.

7. The improvement as in claim 6 wherein the ammonium salt is ammonium chloride.

8. In a method of preparing a dibutyl ester of phenylboronic acid by reaction between a tributyl borate and phenylmagnesium bromide, the improvement which comprises adding to the reaction mass, containing the Grignard complex obtained as an intermediate product of the reaction, a saturated aqueous solution of ammonium chloride in an amount just sufficient to decompose said Grignard complex; and isolating the resulting dibutyl phenylboronate from the reaction mass.

References Cited in the file of this patent

Kharasch et al.: Grignard Reactions of Non-metallic Substances, Prentice Hall, Inc., New York, N. Y., 1954, pp. 3, 1013–1015, 1255, 1256, 1335, 1336.

UNITED STATES PATENT OFFICE

Certificate of Correction

Patent No. 2,862,951

December 2, 1958

Stanley F. Stafiej

It is hereby certified that error appears in the printed specification of the above numbered patent requiring correction and that the said Letters Patent should read as corrected below.

Column 2, line 14, for "Me·BBr→$_2$" read —Me·BBr$_2$→ —; line 35, for "di-n-ocetyl-boronite" read —di-n-octylboronite—.

Signed and sealed this 7th day of April 1959.

[SEAL]

Attest:
KARL H. AXLINE,
*Attesting Officer.*

ROBERT C. WATSON,
*Commissioner of Patents.*